Figure 1:
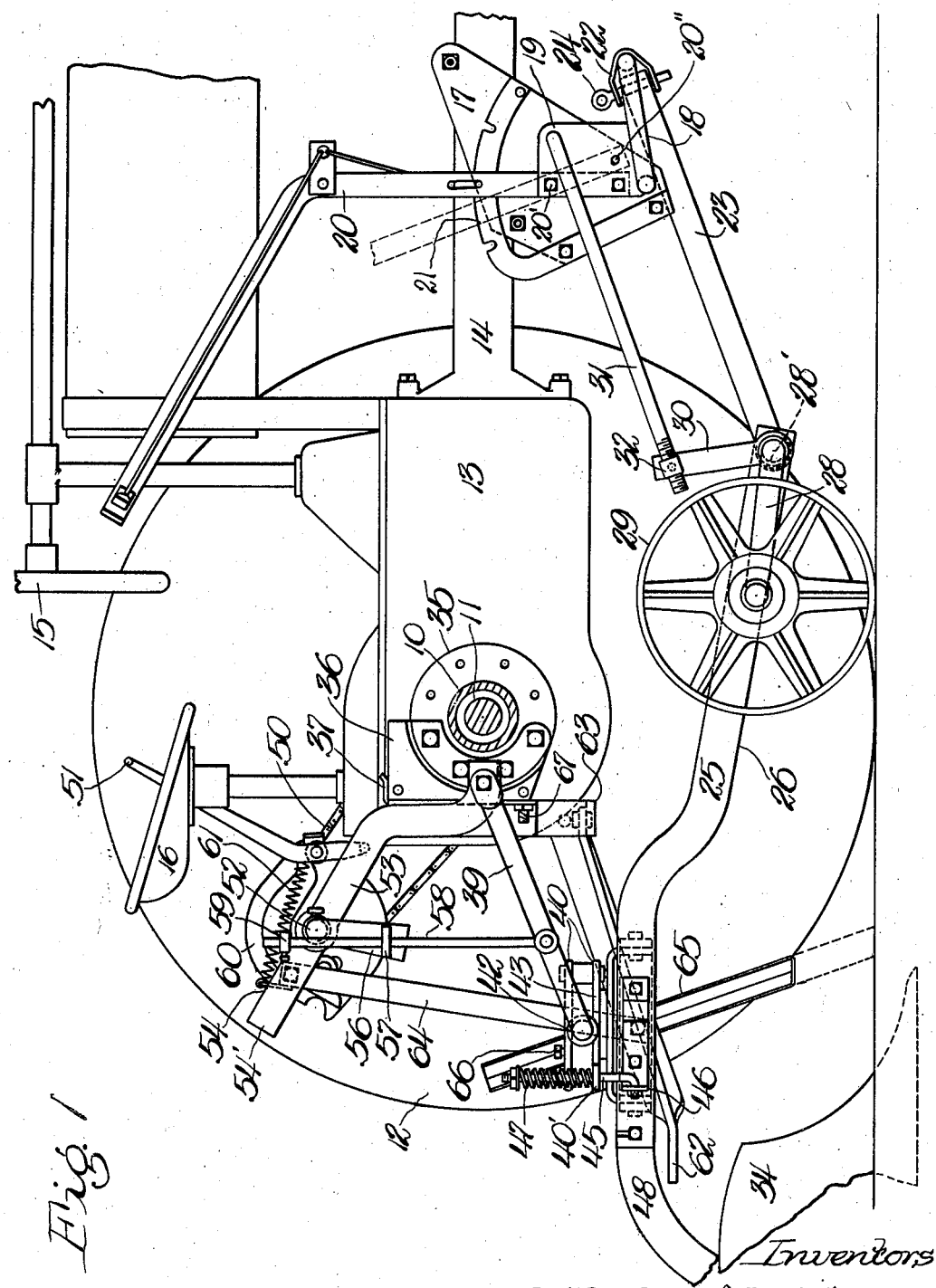

July 19, 1938.  A. C. LINDGREN ET AL  2,124,203

TRACTOR PLOW

Filed Aug. 24, 1936  2 Sheets-Sheet 1

Inventors
A. C. Lindgren & W. S. Graham
By V. F. Larraque Atty.

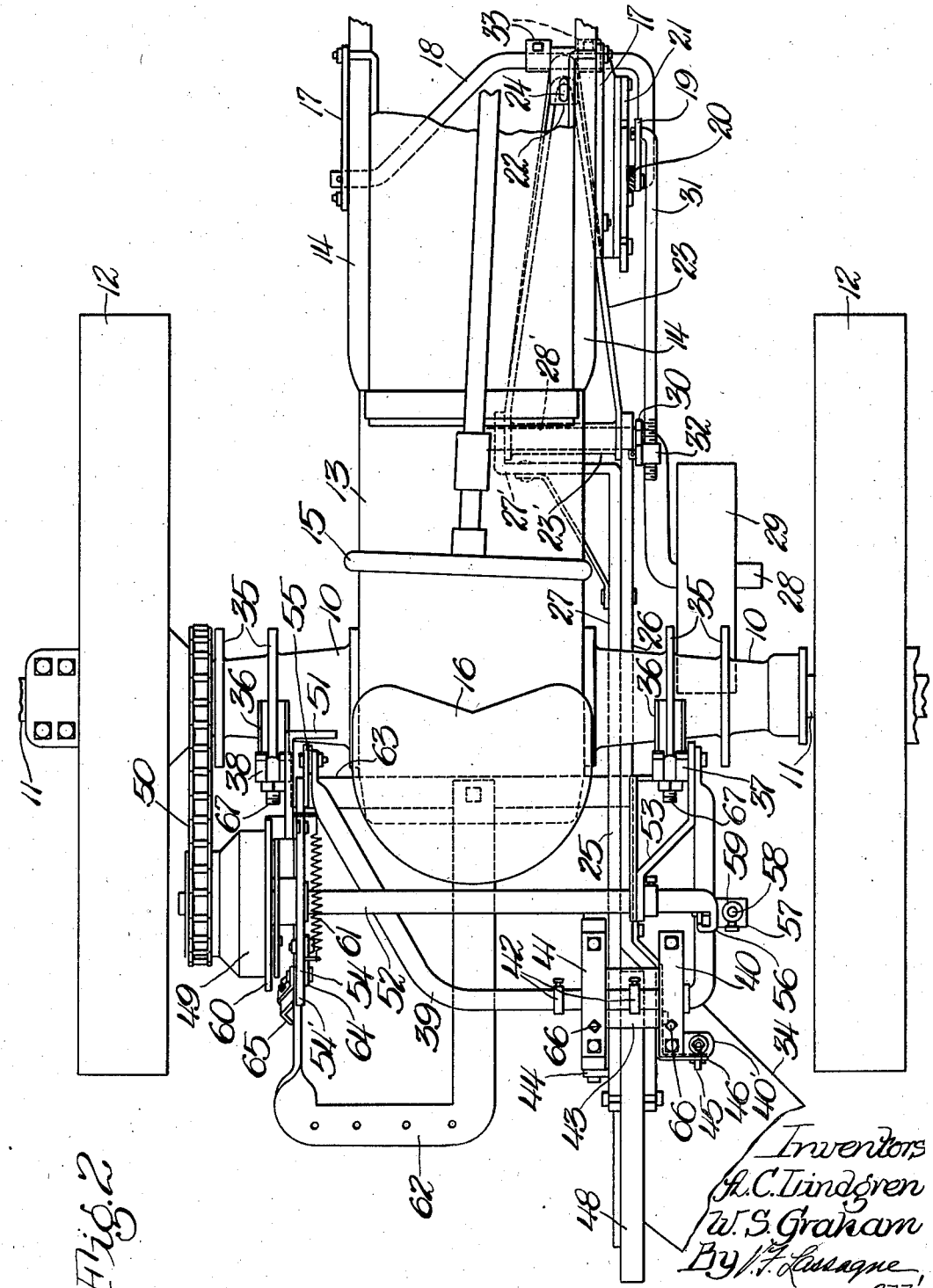

Patented July 19, 1938

2,124,203

UNITED STATES PATENT OFFICE 2,124,203

TRACTOR PLOW

Alexus C. Lindgren, Chicago, and William S. Graham, Canton, Ill., assignors to International Harvester Company, a corporation of New Jersey Application August 24, 1936, Serial No. 97,534

11 Claims. (Cl. 97—47)

This invention relates to tractor plows, and, more particularly, to the manner of connecting the plow to the tractor and is a species of the invention disclosed in the United States patent to A. C. Lindgren et al., 1,941,013, granted December 26, 1933.

In tractor plows it is desirable that the plow be stabilized to hold the plow bottom in proper position and prevent it from running too much on the wing or land side. It is desirable also that the plow be pulled by the tractor while plowing, so that up and down movement of the tractor, as its wheels pass over uneven surfaces, will not affect the plow. This requires that the plow shall carry its own depth gauging means and it is desirable that such means shall be readily adjustable by a device on the tractor within convenient reach of the operator's station thereon.

It is known from experience that the draft member should be connected to the tractor at a certain point and to the plow at just the right height, so that the pull will put the right amount of pressure on the gauge wheel attached to the plow beam. It has been found also that, if the hitch point on the tractor is too high, it will have a tendency to raise the gauge wheel off of the ground or run lightly on the ground; and, if the hitch point is too low, it will throw too much weight on the gauge wheel.

It is the primary purpose of this invention to meet these requirements by simple and efficient means and to provide connections between the plow and tractor which will embody means for causing appropriate adjustment of the depth gauge on the plow as the hitch points of the plow to the tractor are raised or lowered. More specifically, the main object is to cause the gauge wheel on a plow beam to be raised relatively to the beam when the line of draft is lowered, and vice versa, thus maintaining proper contact of the gauge wheel with the ground, and also for the gauge wheel to be raised with the beam when the plow as a whole is lifted for transport.

Other objects of the invention are to provide a hitch for a direct connected tractor plow which comprises a draft frame having two adjustable points of pivotal connection between the plow beam and the tractor and a gauge wheel carried at the rearmost point of pivotal connection for regulating the height of the rear end of the draft frame, the structural relations being such that both points of pivotal connection will be raised or lowered an equal amount upon adjustment for depth of plowing, while the gauge wheel is simultaneously moved an equal amount in the opposite direction and also such as to confine the draft forces only to the hitch connections between the plow and tractor at all adjustments.

Another object of the invention is to so relate the connections for adjusting the hitch of the plow and the gauge wheel connections as to prevent any of the draft forces developed in plowing from being transmitted through the adjusting connections for the gauge wheel, thereby maintaining accurate gauging of the plowing depth under all conditions.

The foregoing and other objects, which will be evident to those skilled in the art, are attained by the structure hereinafter described and claimed, and illustrated in the accompanying drawings, wherein:

Figure 1 is a side elevation of a tractor having its right rear wheel removed, showing a direct connected tractor plow mounted on the tractor with the specific front connections between the plow and tractor embodying the novel adjusting means for adjusting the depth gauge on the plow as the hitch of the plow is raised or lowered; and, Figure 2 is a plan view of the rear portion of a tractor having the plow shown in Figure 1 connected thereto.

The invention is illustrated in connection with a tractor of the general purpose type having a rear axle housing 10 from which differentially driven axle shafts 11 project. The shafts 11 have traction wheels 12 adjustably secured thereto in any suitable manner. The tractor includes a forwardly extending body portion 13 having side sills 14, which extend to the front of the tractor which is supported on dirigible steering wheels, not shown. The dirigible wheels are controlled through a steering wheel 15 located adjacent the operator's station 16. The tractor may be considered as a wheel supported implement frame when implement attachments are attached thereto.

In the practice of the present invention, a depending hanger member 17 is bolted or otherwise clamped to each sill member 14 at about the middle portion of the tractor, as best shown in Figure 1. The hanger members are preferably inclined rearwardly and at their lower ends they have pivoted thereto the arms of a forwardly extending bail-shaped draw-bar 18. One of the arms of the draw-bar 18 has welded or otherwise secured thereto a plate-shaped member 19 forming a bracket mounting.

Bolted to the bracket member 19 is an adjusting lever 20 extending upwardly and rearwardly to within reach of the operator's station 16. The adjusting lever 20 is adjusted about a quadrant member 21 secured to the depending hanger member 17. The adjusting lever 20 is held in position by the usual detent and notch construction on the adjusting lever and quadrant. The adjusting lever may be operated by actuating the usual thumb latch releasing the detent from the quadrant, whereupon the adjusting lever may be adjusted in a plurality of positions. By this arrangement, movement of the lever 20 will serve to adjust the draw-bar vertically.

The adjusting lever 20 may be adjusted about its pivot 20' on the bracket member 19 and secured, as at 20'', so that the adjusting lever 20 takes the dotted position, as shown. As the amount of adjustment provided by the quadrant member is fixed, by providing adjustment of the lever 20, additional adjustment may be provided for the draft bail 18 and gauge wheel 29, in order that the plow bottom may plow deeper than is provided for with the original lever setting. With the arrangement for adjusting the lever 20 just described, it is evident that each notch on the adjusting quadrant may provide for two plowing depths.

As best seen in Figure 1, the draw-bar or bail member 18 has pivotally connected to it at any selected point on its transverse portion a coupling member 22. Attached to the coupling member 22 is the rearwardly extending V-shaped draft connection 23. The V-shaped draft connection 23 is removably connected to the coupling member 22 by a draft pin 24. The rear end of the V-shaped draft connection 23 is connected to a plow beam 25 in such a manner as to provide a vertically flexible connection. The plow beam 25 comprises two longitudinally extending members 26 and 27. The left member 27 has its forward end extending inwardly toward the midportion of the tractor and then longitudinally, as at 27'. The draft member 23 is pivotally connected to the members 26 and 27, as best shown in Figure 2, by a transverse shaft portion 28' of a cranked axle 28, upon which a transverse brace member 23' of the draft member 23 is journaled. The cranked axle 28 supports at its outer end a gauge wheel 29 for the plow beam 25. Welded or otherwise secured to the cranked axle 28 to the right of the plow beam member 26 is an adjusting arm 30 for the gauge wheel 29. Extending forwardly from the adjusting arm 30 to the bracket 19, which is adjustable with the adjusting lever 20 and the draft bail 18, is an adjusting link 31. The adjusting link 31 is adjustably connected at its rear end by a threaded member 32 pivotally mounted on the adjusting arm 30. The forward end of the adjusting link 31 is pivotally connected to the bracket member 19. It is, therefore, obvious that, by removing the member 32, the length of the adjusting link may be adjusted by threading the member 32 fore and aft on the member 31 and again securing it to the arm 30. The plow draft connection 23 may be adjusted laterally toward or away from the center of the tractor by adjusting the position of adjusting collars 33 on the transverse portion of the draft bail 18. From the description of the connections to the draft bail and to the gauge wheel for adjusting the plow, it is obvious that a simple construction has been provided for adjusting the draft bail 18 vertically in order to raise or lower the hitch of the plow. As the hitch is lowered, the gauge wheel 29 will be raised, thereby allowing the plow to plow more deeply, and, by raising the hitch 18, the gauge wheel 29 will be lowered, thereby causing the plow to plow more shallowly.

With the plow in plowing position, as shown in Figure 1, all of the draft of the plow is transmitted from the plow beam through the draft connection 23, which is, therefore, a tension member and the gauge wheel adjusting link 31 is under compression, forming a compression member because of the ground pressure between the gauge wheel 29 and the unplowed ground.

The various members have been so proportioned that the pressure between the gauge wheel and the ground is sufficient to keep the gauge wheel in contact with the ground when going over depressions or uneven ground, yet having the pressure relatively slight to prevent excessive pressure on the furrow wall, causing it not to be broken down. In addition, as the forward end of the draft connection and the rear connection of draft connection to the plow beam are adjusted substantially the same for each position of the plow bottom, the pressure between the gauge wheel and the ground is, therefore, substantially the same in all adjusted positions of the plow bottom. It is also obvious that as the pivoted draft connection 23 and gauge wheel adjusting link 31 are substantially parallel links, a parallel action is formed with the plow beam while the plow is in operation, and, although the gauge wheel is located back of the connecting point of the beam with the draft connection 23, this connecting point travels with the same vertical movement as if the gauge wheel were under the end of the beam at the point of connection of the beam and draft connection.

In the present forecarriage construction, there is thus provided structure, so that, when the gauge wheel of the forecarriage construction is raised or lowered, the hitch connection on the tractor is raised and lowered a corresponding amount, thus keeping the proper pressure on the gauge wheel at all times.

It is, therefore, evident too, as the gauge wheel travels with an up and down movement when riding over uneven ground in the plowing operation, that the connection of the plow beam with the forecarriage travels with the same up and down movement as the forecarriage. With the construction just described, it is possible to position the gauge wheel back reasonably close to the plow bottom and at the same time have the plow beam as long as possible.

In addition, with this tractor attached implement in the nature of a direct connected plow attachment, there has been provided with this plow attachment a draft connection with two adjustable points of pivotal connection between the plow beam and the tractor. The attachment also has a gauge wheel construction at the rear end of the draft connection for regulating the height of the rear end of the draft connection including a lever on the tractor for regulating the height of the front end of the draft connection and a connection between the lever and the gauge wheel, to raise both ends of the draft member simultaneously as the gauge wheel is set for shallow plowing, and to lower both ends of the draft member simultaneously when the gauge wheel is set for deep plowing. With this construction, the adjusting lever 20 accurately adjusts the hitch height of the draft bail 18. Any desired independent adjustment of the gauge wheel is obtained by adjusting arm 30 on link 31. While adjusting the hitch of the plow, the gauge wheel is correspondingly raised when the hitch of the plow is lowered for deeper plowing and is lowered when the hitch of the plow is raised for shallow plowing. The connection between the coupling member 22 and the draw-bar 18 is such as to permit free lateral and vertical movement of the plow with respect to the tractor.

To raise and lower the plow from and to operating position, the axle housings 10 of the tractor have mounted thereon the lifting mechanism for the plow attachment. In a preferred form, the axle housings 10 have integral flange members 35, to which are secured quick attachable and detachable coupling members 36. The plow attachment has downwardly extending complementary attaching brackets 37 and 38, which are secured to the coupling members 36. Pivotally attached to the members 37 and 38 at their lower ends is a rearwardly extending bail member 39, the bight portion of which is loosely seated between laterally spaced pairs of straps 40 and 41 secured above the plow beam 25 near its rear end. Stop collars 42 at each side of the strap 41 prevent excessive lateral movement of the plow. The members 40 and 41 are attached to a transverse member 43, which, in turn, is pivoted to a bracket 44 secured to the longitudinal beam member 27. A spring release adjustment for tilting the plow beam is attached to a lower member 40' and has the adjusting rod 45 pivotally connected to a support 46 attached to the longitudinal beam member 26. With this spring release adjustment 47, the plow bottom 34 may be leveled and at the same time, if an obstruction is encountered by the plow bottom, this connection will allow the plow bottom to swing to the left. The plow bottom 34 is mounted on a beam member 48, which is in frictional engagement with the beam members 26 and 27 to permit the plow bottom to move vertically in case an obstruction is encountered.

Vertical swinging movement of the bail 39 serves to raise and lower the plow, and this swinging movement of the bail is effected in this instance by a power lift mechanism 49 of the one-half revolution clutch type actuated by the forward movement of the tractor. The power lift mechanism 49 is driven from the left wheel 12 by a sprocket driving the chain 50, which in turn drives the clutch portion of the power lift mechanism. The power lift mechanism 49 is thrown in and out of operation by the hand lever 51 extending to within reach of the operator's station 16. As the lever 51 is actuated, the power lift mechanism 49 actuates a transversely extending shaft 52 journaled in rearwardly extending supports 53 and 54. The rearwardly extending supports 53 and 54 are secured to the members 37 and 38, respectively. The bail member 39 at its forward end is pivotally mounted to an extension of the member 53 and to the bracket 55 welded or otherwise secured to the support 38. The transverse shaft 52, at its right end, has a crank arm portion 56. The crank arm 56 has a lost motion connection 57, through which a pivotally mounted thereon, a lifting rod 58 extends vertically. The lifting rod 58 is connected at its lower end to the lifting bail 39 and has at its upper end an adjusting collar 59 engaged by the lost motion connection 57. The hand lever 51 having the throw-out roller attached thereto is held in engaging position with a clutch member 60 of the one-half revolution clutch 49 by a spring 61.

It is, therefore, obvious that, as the power lift mechanism is actuated, the crank arm 56 will move through 180 degrees, raising the plow from ground engaging position, as shown, to transport position, and, as the plow is raised to transport position, the gauge wheel 29, which is mounted on the plow beam 25, will also be raised from ground engaging position to transport position.

As the plow beam 25 is being raised when the bail 39 moves upwardly, there is a tendency for the forward part of the beam 25 to drop, due to the weight of the gauge wheel 29 and the pivoted connection of the plow beam 25 with the draft connection 23. Further dropping of the gauge wheel 29 is prevented, so that the gauge wheel may be in a raised position for transporting, because, as the bail 39 travels upwardly, it engages and abuts against the rear spacing members, between the upper and lower spaced members 40 and 41. In doing this, the result is to cause plow beam 25 and the draft connection 23 to assume such a position as to approach a straight line in order to keep the gauge wheel 29 in a raised position for transport purposes. After releasing the power lift mechanism to drop the plow to working position, the beam 25 and the draft connection 23 assume the position shown in Figure 1.

In order that some other tractor attached implement may be drawn by the tractor, an additional draft bail 62 of U-shape is mounted on the plow attachment. The legs of this U-shaped draft bail 62 extend forwardly to a downwardly extending U-shaped draft connection support 63. The U-shaped support 63 has its vertical leg members secured to the complementary coupling members 37 and 38 by welding or by some other means. The right leg of the member 63 extends rearwardly and upwardly and is attached to the member 53 and acts as a support for the transverse shaft 52, which is journaled in the members 53 and the rearwardly extending portion of the member 63. On the left hand side, the member 63 has a rearwardly extending portion 54', to which the spring 61 is attached at its rear end. A supporting brace 64 is connected at its upper end to the member 54 and at its lower end to a forwardly extending leg of the draft bail 62.

In order to retain the plow attachment in detached position for subsequent attachment, an adjustable support 65 may be adjustably mounted on the forwardly extending left leg member of the U-shaped draft bail 62. When the plow is ready to be detached, the member 65 is lowered to ground engaging position, as shown in the dotted lines in Figure 1, and secured in position by a set screw or other means.

As previously described, the plow is raised and lowered from ground engaging position to transport position by the actuation of the hand lever 51. When the plow is ready to be dropped for plowing position, the lever 51 is actuated as the tractor is driven forwardly and the plow is dropped. The suction of the plow immediately causes the plow bottom 34 to enter the ground to the depth set by the operator by means of the adjusting lever 20. The plow bottom may be lowered by adjusting the lever 20 forwardly, causing the draft connection 18 to be lowered and at the same time the gauge wheel 29 to be raised, thus allowing the plow bottom to plow more deeply. If it is desired to plow more shallowly, the adjusting lever 20 is adjusted about the adjusting quadrant 21, causing the draft connection 18 to be raised and at the same time the gauge wheel 29 to be lowered, thus causing the plow bottom 34 to plow more shallowly.

In detaching the plow attachment from the tractor, the support 65 is placed in ground engaging position, after the plow bottom has been lowered to ground engaging position upon some level surface. The adjusting collar 59 is adjusted against the lost motion connection 57 to firmly brace the upper portion of the plow attachment. Set screws 66 are locked on the bail member 39. Next, swinging bolts 67 are loosened and swung away from the supports 37 and 38. The draft connection 23 is disconnected at its forward end by removing the draft pin 24, and the adjusting link 31 is similarly detached at its forward end from the bracket member 19. The tractor is now ready to be driven away by the operator after the chain 50 has been removed from the power lift mechanism 49. It is obvious that the tractor plow attachment may be connected to the tractor by attaching the parts in the reverse order from that in which they were detached.

It will accordingly be clear that the novel arrangement described provides a freely floating plow attachment including a depth gauge carried on the plow and adjustable by means of mechanism mounted on the tractor and acting on the gauge means through vertical adjustments imparted to the draft connections between the plow and tractor. It is accordingly unnecessary to provide a separate adjusting device for the gauge wheel, as has heretofore been the practice.

The specific construction herein described and illustrated is obviously capable of certain modifications without departure from the scope of the invention as defined in the following claims.

What is claimed is:

1. A tractor plow connection comprising the combination with a tractor of a forwardly extending draw-bar pivoted on the tractor for vertical adjustment, means on the tractor for adjusting the draw-bar, a bracket member movable with the draw-bar about the axis of the draw-bar, a ground working tool including a beam having its forward end flexibly coupled to the draw-bar, a rearwardly extending cranked axle journaled on the forward portion of the beam for swinging movement vertically, an upright arm fixed to the axle, and a link pivotally connecting said arm with the bracket member on the draw-bar.

2. A tractor plow connection comprising the combination with a tractor having a rear axle housing and a body extending forwardly therefrom, of laterally spaced hangers secured to said body and depending therefrom forward of the axle housing, a forwardly extending bail-shaped draw-bar having its arms pivoted to the lower ends of the hangers, a bracket member secured to said draw-bar and an adjusting lever mounted thereon for adjusting said draw-bar, a ground working tool including a beam extending under the axle housing and having its forward end flexibly connected to the draw-bar, a rearwardly extending cranked axle journaled on the forward portion of the plow beam for swinging movement vertically, an upright arm fixed on said axle, and a link pivotally connecting said arm with the aforesaid bracket member, whereby the vertical adjustment of said draw-bar in one direction effects corresponding adjustment of said cranked axle in an opposite direction.

3. A tractor plow connection comprising the combination with a tractor having a rear axle housing and a body extending forwardly therefrom, of laterally spaced hangers secured to said body and depending therefrom forward of the axle housing, a forwardly extending bail shaped draw-bar having its arms pivoted to the lower ends of said hangers and having a bracket member secured to one of its arms, said bracket member extending upwardly of said point of pivotal connection, means for holding the draw-bar at adjusted position, a ground working tool including a beam extending under the axle housing and having its forward end flexibly connected to the draw-bar, means on the rear of the tractor for lifting and lowering the ground working tool, a rearwardly extending cranked axle journaled on the forward portion of the beam for swinging movement vertically, a gauge member mounted on said cranked axle, an upright arm fixed on said axle, and a link pivotally connecting said arm with the aforesaid bracket member on the draw-bar, whereby, upon the raising and lowering of said beam, the gauge member is raised to transport position and lowered to ground engaging positions.

4. The combination with a motor propelled wheeled vehicle, of an implement attachment comprising a beam member and a draft connection for said beam member, said draft connection comprising a bail-shaped draw-bar construction mounted for vertical adjustment, a pair of substantially parallel members pivotally mounted at their forward ends on said draw-bar construction and one of said members forming a draft connection for said implement attachment, a gauge construction for said beam member comprising a rearwardly extending cranked axle pivotally mounted on said beam member, a gauge member mounted on said cranked axle, means for pivotally mounting said draft connection at its rear end on the axis of said cranked axle, an arm on said cranked axle, and means for connecting the other of said parallel members to said arm; whereby vertical adjustment of said draw-bar effects corresponding adjustment of the gauge member.

5. The combination as set forth in claim 4 said motor propelled vehicle having a power lift mechanism operated from the motor, means for flexibly connecting said power lift mechanism to the aforesaid beam member whereby upon the actuation of said power lift mechanism the beam member will be raised and, the gauge member will be raised to transport position and lowered to ground engaging position.

6. The combination as set forth in claim 4, said draft connection having one of said parallel members which is connected to said cranked axle adjustable in length whereby said gauge member may be independently adjusted.

7. The combination as set forth in claim 4, means for adjusting said draw-bar; whereby, upon the adjustment of said draw-bar in one direction, a corresponding adjustment of said cranked axle is effected in an opposite direction.

8. A tractor draft connection comprising the combination with a tractor of a draw-bar pivoted on the tractor for vertical adjustment, means on the tractor for adjusting the draw-bar comprising an adjusting lever and quadrant, a bracket member movable with the draw-bar about the axis of the draw-bar, a ground working tool including a beam having its forward end flexibly coupled to the draw-bar, and the aforesaid adjusting lever adjustably mounted on the bracket member whereby additional adjustment of the draw-bar and ground working tool may be had.

9. The combination with a wheel supported implement frame, of an implement attachment mounted thereon comprising an implement beam with a ground engaging tool mounted thereon and a draft connection connecting the implement beam with the implement frame and having adjustable front and rear points of pivotal connection between the implement beam and the implement frame, gauge means adjustably mounted at the rear pivotal connection and between the ground engaging tool and the rear pivotal connection, means for adjusting said gauge means for regulating the ground engaging depth of the implement attachment comprising a compression member connecting the gauge means and the means for adjusting the gauge means, and the aforesaid draft connection being in tension for transmitting all the draft forces of said implement attachment through the aforesaid pivotal connections, the aforesaid means for adjusting the gauge means comprising means for adjusting the front pivotal connections, whereby both pivotal connections will be raised or lowered upon adjustment for the ground engaging depth of the implement attachment.

10. The combination with a wheel supported implement frame, of an implement attachment mounted thereon comprising an implement beam with a ground engaging tool mounted thereon and a draft connection connecting the implement beam with the implement frame and having adjustable front and rear points of pivotal connection between the implement beam and the implement frame, gauge means adjustably mounted on the implement beam, means for adjusting the gauge means for regulating the ground engaging depth of the implement attachment comprising a compression member connecting the gauge means and means for adjusting the gauge means, and the draft connection being in tension for transmitting all the draft forces of the implement attachment through the pivotal connections, the said means for adjusting the gauge means comprising means for adjusting the front pivotal connections whereby both pivotal connections will be raised or lowered upon adjustment for the ground engaging depth of the implement attachment.

11. In combination with a wheel supported implement frame, a beam member having a ground working tool, draft means for connecting the beam member to the frame comprising means mounted for vertical adjustment, a pair of substantially parallel members pivotally mounted on said vertical adjustable means, one of said parallel members forming a draft connection for the beam member, gauge means for said beam member comprising a cranked axle mounted on the beam member, a gauge member mounted on the cranked axle, an arm on the cranked axle and means for connecting the other of said parallel member to the arm, whereby vertical adjustment of the vertical adjustable means effects corresponding adjustment of the gauge members.

ALEXUS C. LINDGREN.
WILLIAM S. GRAHAM.